United States Patent

[11] 3,587,403

| [72] | Inventors | Donald C. Connett<br>Rochester, Mich.;<br>Arthur R. Whited, Jr., Windsor, Ontario,<br>Canada |
|---|---|---|
| [21] | Appl. No. | 3,443 |
| [22] | Filed | Jan. 16, 1970 |
| [45] | Patented | June 28, 1971 |
| [73] | Assignee | Sperry Rand Corporation,<br>Troy, Mich. |

[54] POWER TRANSMISSION
8 Claims, 1 Drawing Fig.

[52] U.S. Cl. .................................................. 91/504,
91/507
[51] Int. Cl. .................................................. I04b 1/02
[50] Field of Search ........................................... 91/499,
504, 507

[56]   References Cited
UNITED STATES PATENTS

| 1,817,080 | 8/1931 | Howard | 91/485 |
| 2,779,296 | 1/1957 | Dudley | 91/485 |
| 3,155,047 | 11/1964 | Keel | 91/485 |
| 3,479,963 | 11/1969 | Randa | 91/485 |

*Primary Examiner*—William L. Freeh
*Attorney*—Van Meter and George

ABSTRACT: A hydraulic pump or motor unit of the axial piston type having a revolving cylinder barrel driven by an in-line shaft has an improved means for preventing separation of the hydrostatic bearings at the piston ends and at the cylinder barrel face. A revolving flange at the back of the hydrostatic bearing is contacted by several nonrevolving shoes which are biased toward the flange with a wedging action which allows takeup of any wear in the bearing surfaces but does not allow the shoes to be moved retractively by the separation forces created at the hydrostatic bearing.

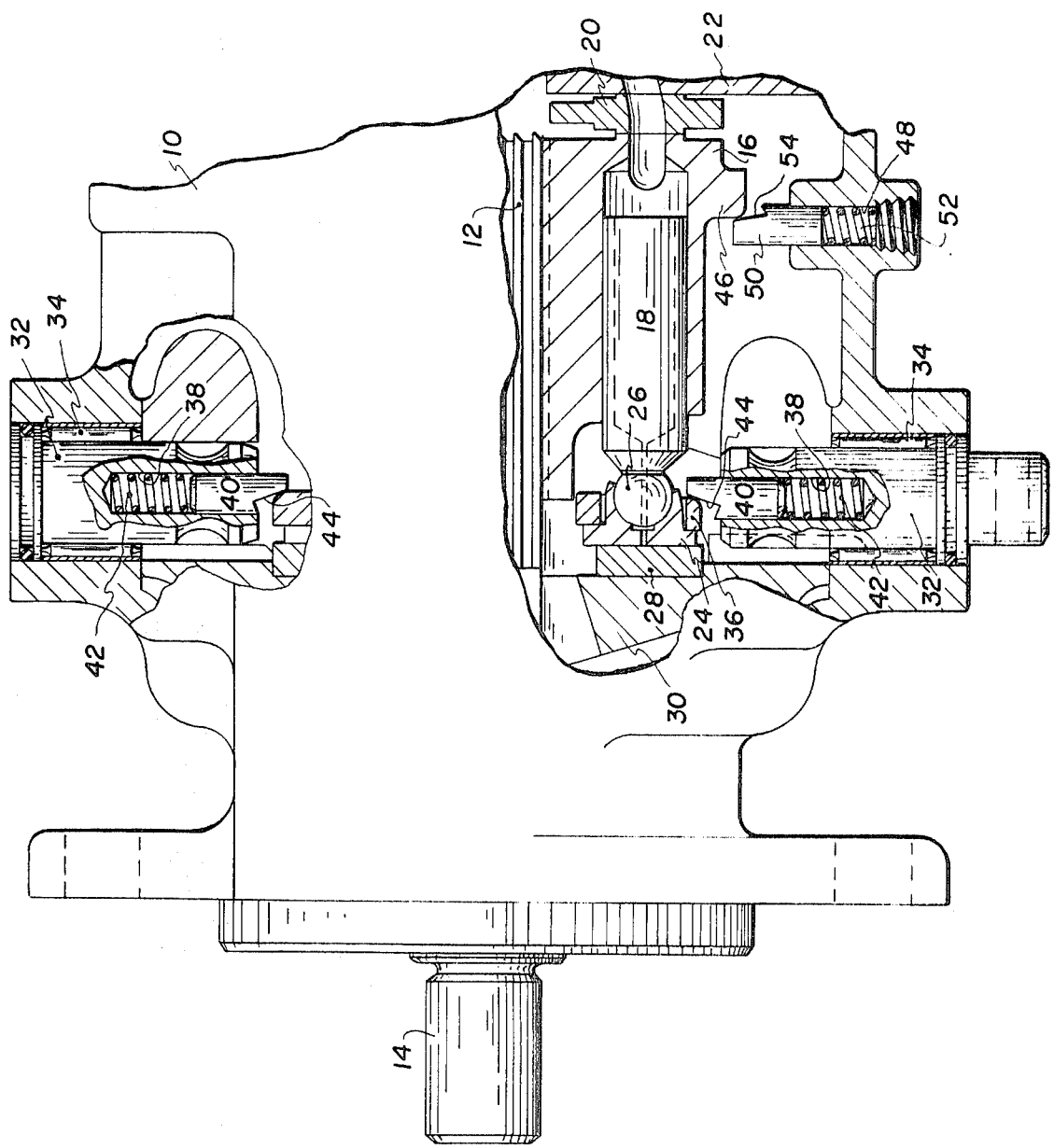

POWER TRANSMISSION

Axial piston pump or motor units of the inline type utilize hydrostatic bearings between the rotating surfaces at the end of the cylinder barrel and at the ends of the pistons respectively. These bearings, by proper design, may utilize the fluid pressures built up in the cylinders of the unit to provide self-lubrication and to counterbalance hydraulically those static forces which tend to bring the bearing faces into metallic contact. Regardless of how finely a given design may achieve this hydrostatic balance, there are nevertheless dynamically created forces which cannot be counterbalanced in this manner, since they vary with the speed at which the unit is operating. It has heretofore been necessary to apply mechanical loads to the pistons and to the cylinder barrel which loads are normally fixed in amount, as for example, by the use of preloaded springs tending to hold the hydrostatic bearings against separation. Such devices are satisfactory only up to a certain limit of speed before the dynamic forces are able to overcome the fixed holddown force. If the holddown force is made higher in an effort to achieve a higher speed rating, difficulties are then experienced in keeping the hydrostatic bearing surfaces separated during low-speed operation. The alternative of providing a positionally fixed holddown mechanism is even less satisfactory at any speed because it presents its own bearing problems which may be solved only by costly and bulky arrangements.

The present invention aims to overcome these difficulties and to provide a holddown means which applies only a light, substantially constant force, holding the bearing surfaces together when the dynamic forces are low, and yet which will apply a resisting force of several times that magnitude, when the dynamic forces are high enough to require it. In this way, the allowable top speed of a given pump or motor unit may be increased greatly over that possible with conventional units.

The invention consists of an axial piston pump or motor unit having at least one hydrostatic bearing means provided with a rigid rotary flange having a working surface facing away from the bearing means; a plurality of spring biased nonrotating shoes are mounted for movement toward the flange and have faces in rubbing contact with the flange and disposed at an acute angle with respect to the direction of shoe motion whereby a wedging action of the shoes upon the flange is produced.

The single FIGURE in the drawing represents a side view, partly in cross section, of a variable displacement axial piston pump or motor unit incorporating a preferred form of the present invention.

The principal elements of the pump illustrated may be of conventional form including, for example, a casing 10 carrying a shaft 12 having a coupling 14 at its exterior end. Splined to the shaft 12 is a cylinder barrel 16 carrying a plurality of reciprocable pistons 18. The right-end face of the barrel 16 abuts a wear plate 20 which, in turn, abuts the end closure member 22 of the housing 10. Each piston 18 has a shoe 24 swaged to its outer end to freely swivel on the ball 26. The shoes 24 slide around a flat swashplate 28 which is secured to a yoke 30. Yoke 30 is oscillatable in the housing 10 by means of its trunnions 32 which turn in bearings 34. Pump units of this general construction are well known. The design of the hydrostatic bearings between the piston shoes 24 and the swashplate 28 on the one hand, and between the cylinder barrel 16 and the valve plate 20 on the other hand, may be readily arranged to produce any desired approach to perfect hydraulic balance so far as the forces produced by hydrostatic pressure within the cylinders are concerned.

The improved holddown means of the present invention is preferably provided both at the piston shoes and at the cylinder barrel, although either may be provided without the other, if desired. At the piston shoes, a ring or flange 36 is provided having a series of holes through which each piston shoe and piston may pass. The right hand or backface of the ring 36 may be provided with a generous radius at its outer edge to provide either a spherical or a toroidal surface. The trunnions 32 have central bores 38 in which holddown plungers 40 are slidably mounted, and are biased inwardly toward the flange 36 by springs 42. The holddown plungers 40 have inclined slant faces 44 which bear in rubbing contact upon the curved surface of the flange 36.

The improved holddown means at the cylinder barrel 16 comprises a flange 46 formed on the exterior of the cylinder barrel, and presenting a surface facing away from the hydrostatic bearing between the cylinder barrel and the valve plate 20. This surface may be curved at its exterior similar to the backface of the ring 36. The housing 10 is provided with a plurality of bores 48 similar to the bores 38 and these carry plungers 50 and spring 52 similar to plungers 40 and springs 42. These are preferably so located around the circumference of the cylinder barrel as to react most effectively thereon at the point where the tipping forces first tend to cause bearing separation. The wedging angle of the rubbing faces on the plungers 40 and 50 is chosen as an angle which is acute with relation to the direction of motion of the plunger. It will preferably be chosen, however, to be less acute than would be necessary to provide a locking action of the wedge.

In operation, as the shaft 12 is rotated carrying with it the cylinder barrel 16, the pistons 18 are caused to reciprocate within their cylinders by the action of the swashplate 28 on the piston shoes 24. The stroke of the pistons is determined by the angle at which the yoke 30 is set and fluid is alternately ingested and expelled through the commutating action at the valve plate 20. The hydrostatic bearings at the shoes and the cylinder barrel are normally so designed as to produce a slight separating force because of the hydrostatic pressure existing within the cylinders, and this force is resisted by the force produced by the preloaded springs 42 and 52 acting through plungers 40 and 50 on the flanges 36 and 46. The springs may move the hydrostatic bearing surfaces into a closer relation; as, for example, when oil viscosity decreases. Their force is then multiplied by the wedging effect of the inclined surfaces 44 and 54. The preloaded spring forces may be so chosen as to produce at the hydrostatic bearing a closing force overcoming not only the small hydrostatic separating force, but also the dynamic separating forces which exist at low or medium speed. However, at high or very high speeds, when the dynamic forces of separation increase greatly, these forces must act in a reverse direction through the wedge and flange interface. They thus react upon the springs with a mechanical disadvantage which is determined, of course, by the angle of the wedge face. In addition, the increasing separating force under these conditions applies a high side load between the plungers 40 and 50 and their bores 38 and 48 and thus produces an increased friction force which must be overcome in order for separation to take place.

The invention thus produces a holddown means for the hydrostatic bearing means in which the high separating forces of inertia and centrifugal force which exist at high speeds may be effectively resisted by preloaded springs without, however, imposing more than a small fraction of these forces to the hydrostatic bearings at the very slowest speeds. This contributes also to reduced friction at the hydrostatic bearing, thus improving torsional and overall efficiency.

We claim:

1. In an axial piston pump or motor unit having a cylinder barrel rotatable relative to a stationary commutating valve plate, a drive shaft in line with, and drivingly connected to the cylinder barrel, a set of pistons reciprocable relative to the cylinder barrel, a swashplate for causing reciprocation of the pistons, hydrostatic bearing means between the pistons and the swashplate, and other hydrostatic bearing means supporting the cylinder barrel on the valve plate, the combination of a holddown structure for preventing separation of at least one of the bearing means, and including a rigid rotary flange having a working surface facing away from the bearing means, a plurality of spring biased nonrotating shoes mounted for movement toward the flange and having faces in rubbing contact with the flange and disposed at an acute angle with respect to the direction of shoe motion whereby a wedging action is produced to cause ready positive engagement between the shoes and the flange, and to prevent retraction of the shoes by forces acting to separate the bearing means.

2. A unit according to claim 1 wherein the holddown structure is located adjacent the bearing means between the pistons and the swashplate.

3. A unit according to claim 2 wherein the swashplate is oscillatable upon an axis transverse to the shaft and the shoes are mounted for movement along said axis.

4. A unit according to claim 3 wherein the swashplate includes trunnions extending radially outwardly therefrom and provided with inwardly facing bores on the axis of oscillation and wherein the shoes are reciprocable in said bores.

5. A unit according to claim 1 wherein the shoes are formed as cylindrical plungers; supporting means is provided for the plungers including radial bores in which the plungers may both slide in a direction radial to the shaft and rotate to allow freedom for their faces to conform to the surface of the flange.

6. A unit according to claim 1 wherein the holddown structure is located adjacent the bearing means between the cylinder barrel and the valve plate.

7. A unit according to claim 5 wherein the holddown structure is located adjacent the bearing means between the cylinder barrel and the valve plate.

8. A unit according to claim 1 wherein the holddown means includes a first set of shoes adjacent to the bearing means between the pistons and the swashplate and a second set of shoes adjacent the bearing means between the cylinder barrel and the valve plate.